United States Patent [19]

Hensel et al.

[11] Patent Number: 4,575,182

[45] Date of Patent: Mar. 11, 1986

[54] DIELECTRIC OPTICAL WAVEGUIDE CONNECTING DEVICE

[75] Inventors: Paul C. Hensel, Woodbridge; Geoffrey W. Gillings, Ipswich, both of United Kingdom

[73] Assignee: The Post Office, London, England

[21] Appl. No.: 129,566

[22] Filed: Mar. 12, 1980

[30] Foreign Application Priority Data

Mar. 13, 1979 [GB] United Kingdom ............... 7908863

[51] Int. Cl.⁴ ............................................. G02B 7/26
[52] U.S. Cl. ................................................ 350/96.21
[58] Field of Search ............... 350/96.20, 96.21, 96.22

[56] References Cited

U.S. PATENT DOCUMENTS

| 4,047,796 | 9/1977 | Kao et al. | 350/96.21 |
| 4,217,029 | 8/1980 | Kao | 350/96.21 |
| 4,239,334 | 12/1980 | Johnson | 350/96.21 |

Primary Examiner—John Lee
Attorney, Agent, or Firm—Kemon & Estabrook

[57] ABSTRACT

Two optical fibres to be coupled end-to-end are respectively located within a cluster of straight rigid elements. The meeting ends of the elements are tapered to provide docking ramps which ensure precise axial alignment of the clusters.

4 Claims, 4 Drawing Figures

DIELECTRIC OPTICAL WAVEGUIDE CONNECTING DEVICE

This invention is concerned with the joining together of dielectric optical waveguides which being fibrous in character are conventionally referred to as optical fibres. Optical fibres are usually made of glass or quartz and typically have a diameter of the order of 100 microns. To form an optically accurate connection between two fibres the fibres have to meet end to end with precise axial alignment. This presents a problem in view of the very small dimensions involved.

The present invention has for an objective the provision of a device for juxtaposing optical fibres to be connected with the precise axial alignment mentioned above.

In accordance with the present invention an optical fibre is firmly located so as to be restrained against radial shifting in the longitudinally extending socket defined between a cluster of straight rigid elements placed in parallel side-by-side abutting relationship. At one of the ends of the cluster each element is tapered so as to provide a docking ramp. A like cluster housing an optical fibre and having docking ramps with complementary tapers provides the other part of a connecting assembly.

In use the tapered ends of the clusters are pushed axially against one another. The interengagement of the ramps provides precise axial alignment of the clusters and hence of the fibres located therein.

In an embodiment of the invention three identical cylindrical rods 1 make up each cluster and the accompanying drawings diagrammatically illustrate such an embodiment. In the drawings.

Figure 1:
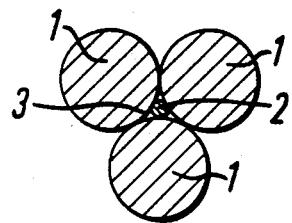
FIG. 1 is a cross sectional view through one cluster of the connecting assembly.

Each cluster comprises three cylindrical rods 1 disposed in side-by-side abutting relationship to provide a triad as illustrated in FIG. 1. Each rod 1 may conveniently be formed from a steel needle roller such as is commercially available for needle roller bearings. Needle rollers offer a high degree of accuracy at a commercially attractive cost. A cylindrical optical fibre 2 is snugly located with contact between the fibre and each rod in the longitudinally extending socket 3 defined between rods 1.

The rod diameter is approximately $6\frac{1}{2}$, in the embodiment, 6.46× the diameter of the fibre with a small allowance for assembly. Thus for a fibre with a diameter of 125 microns each rod has a diameter of 835 microns (125×6.46=808 with 27 microns allowance for assembly). Means, not shown, are provided for securing the rods together and hence holding the fibre. These means may be a spring loaded securing device, or, as will be described with reference to FIG. 4 may be the threadably engaged parts of a coupling device.

Figure 2:
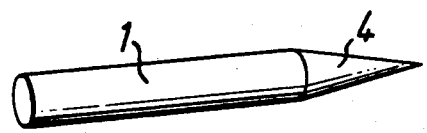
FIG. 2 is a perspective view of one of the rods.

As can be seen on FIG. 2 the end part 4 of each rod 1 is tapered to define a cone the inclined surfaces of which provide the docking ramps. The optimum angle of the cone, i.e. the length of the ramps represents a compromise between tightness of fit, shallow angles and a long cone, and ease of positioning of the fibre end parts, larger angles and a short cone.

The pointed ends of the conical end parts 4 lie in one plane at right angles to the longitudinal axes of the rods 1 and each fibre preferably protrudes unsupported to a point just short of this plane thereby making each rod cluster and fibre identical for interconnection. Over the short unsupported distance the fibres are sufficiently rigid to maintain their exact axial location. In a connection end-to-end abutment is not necessary, a gap of 1 or 2 microns being quite acceptable. On the other hand axial loading possibly produces distortion in the signals and the connection is designed with these parameters in view.

Figure 3:
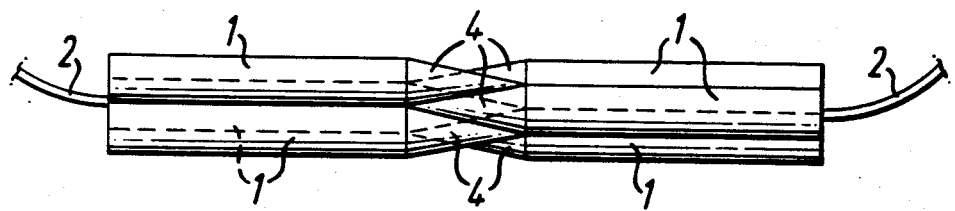
FIG. 3 is a side view illustrating the complete assembly with the axially docked clusters of rods.

In FIG. 3 of the drawing an interlocked pair of clusters is illustrated; as can be seen with the three identical cylindrical rods 1 in each cluster and the congruent conical end portions 4 exact axial alignment is achieved.

Figure 4:
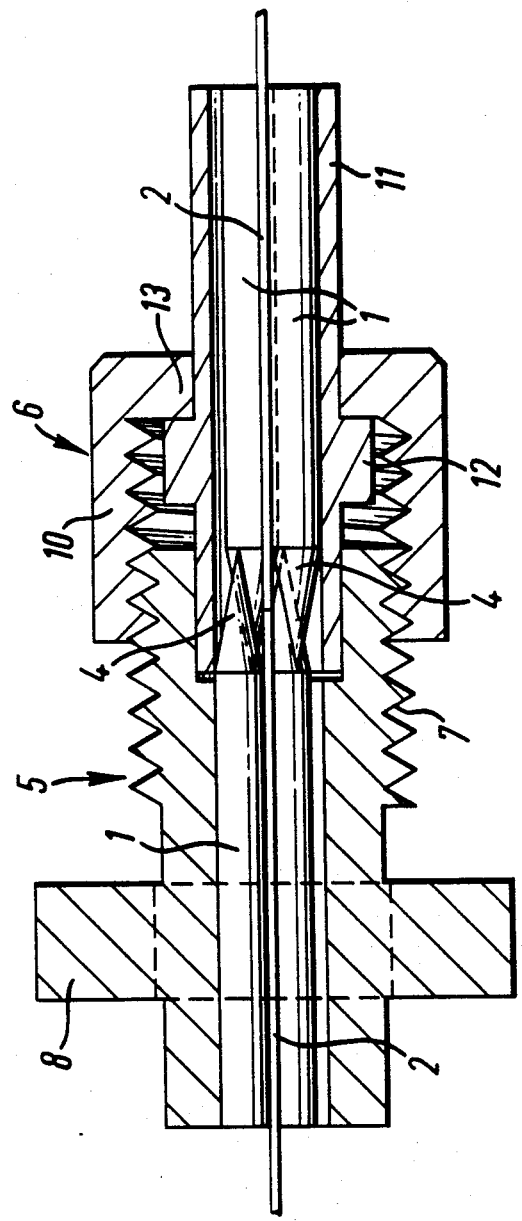
FIG. 4 is a longitudinal section of a practical embodiment of the invention.

In the realised embodiment of FIG. 4 the two clusters of rods 1 are respectively contained in the male and female members 5 and 6 of a coupling device. The male member 5 comprises an externally threaded sleeve 7 containing and securing one cluster of rods 1, an external integral nut 8 and a rearwardly extendable part for housing the fibre 2 to allow a connection. The female member 6 has an internally threaded sleeve 10 to receive and engage sleeve 7 and a tubular part 11 locating and securing the cluster of rods 1. The part 11 has a shoulder 12 which is engaged by end wall 13 of sleeve 10 to effect the coupling. Again tubular part 11 has a rearward extension to house the fibre 2 and to allow a connection.

We claim:

1. A device for interconnecting optical fibres in precise end-to-end relationship, such device comprising two clusters of straight rigid elements in side-by-side abutting relationship, each element in each cluster being tapered at the connecting end into a straightsided docking ramp, the connecting ends being laterally aligned and the ramps in one cluster being complementary to the ramps in the other, thereby achieving precise axial alignment of two optical fibres one positioned in the center of each cluster respectively, when the clusters are docked against one another.

2. A device as claimed in claim 1 wherein each cluster comprises three identical cylindrical rods are symmetrically tapered to define a docking cone.

3. An optical fibre connection comprising docked clusters of the device as claimed in claim 2, each cluster axially locating a fibre wherein the diameter of each rod is approximately $6\frac{1}{2}$ times the diameter of the fibre with a small allowance for assembly.

4. A connection as claimed in claim 3 wherein each cluster is contained in a fitting tubular member and threaded means are provided for securing the tubular members together.

* * * * *